United States Patent [19]
Lemaire

[11] Patent Number: 6,038,211
[45] Date of Patent: Mar. 14, 2000

[54] TERMINAL FOR A BIDIRECTIONAL SYNCHRONOUS DIGITAL HIERARCHY LINK WITH AUTOMATIC PROTECTION SWITCHING CONVEYING MULTIPLEXED DATA

[75] Inventor: Alain Lemaire, Paris, France

[73] Assignee: Alcatel Submarine Networks, Paris, France

[21] Appl. No.: 08/867,882

[22] Filed: Jun. 3, 1997

[30] Foreign Application Priority Data

Jun. 6, 1996 [FR] France ................................. 96 06988

[51] Int. Cl.[7] ......................................... H04J 1/16
[52] U.S. Cl. ............................. 370/216; 370/242
[58] Field of Search .................... 370/216, 217, 370/219, 220, 221, 224, 225, 228, 242, 249, 431, 433, 439, 438, 465, 535, 541; 359/110, 118, 115, 134, 163, 177, 179

[56] References Cited

U.S. PATENT DOCUMENTS

| | | | |
|---|---|---|---|
| 5,406,401 | 4/1995 | Kremer | 359/110 |
| 5,495,472 | 2/1996 | Ohara | 370/216 |
| 5,712,847 | 1/1998 | Hata | 370/228 |
| 5,757,769 | 5/1998 | Ikawa | 370/228 |
| 5,812,289 | 9/1998 | Tomooka et al. | 359/115 |

FOREIGN PATENT DOCUMENTS

| | | |
|---|---|---|
| 0456206A2 | 11/1991 | European Pat. Off. . |
| 2282034A | 3/1995 | United Kingdom . |

OTHER PUBLICATIONS

J. G. Gruber, "Performance and Fault Management Functions for the Maintenance of Sonet/SDH and ATM Transport Networks", Proceedings of the International Conference on Communications (ICC) Geneva, May 23–26, 1993, vol. 3 of 3, May 23, 1993, Institute of Electrical and Electronics Engineers, pp. 1308–1314.

P. Trischitta et al, "The Tat–12/13 Cable network", IEEE Communications Magazine, vol. 34, No. 2, Feb. 1, 1996.

*Primary Examiner*—Huy D. Vu
*Assistant Examiner*—Chiho Andrew Lee
*Attorney, Agent, or Firm*—Sughrue, Mion, Zinn, Macpeak & Seas, PLLC

[57] ABSTRACT

A terminal for a bidirectional synchronous digital hierarchy link with automatic protection switching conveying multiplexed data includes two send devices. Each send device includes a device for extracting from each of the two SDH multiplexes a signal indicating a far end remote failure. It further includes a device for receiving two SDH multiplexes and multiplexing them with service data specific to the link with automatic protection switching into a single multiplex to be sent over a first line. It inserts into this service data the two far end remote failure signals and two additional far end remote failure signals, these two additional signals being supplied by the other send device. The terminal further includes an automatic protection switch for transmitting to the first line one of the two multiplexes supplied by the respective send devices. Applications include underwater links.

3 Claims, 4 Drawing Sheets

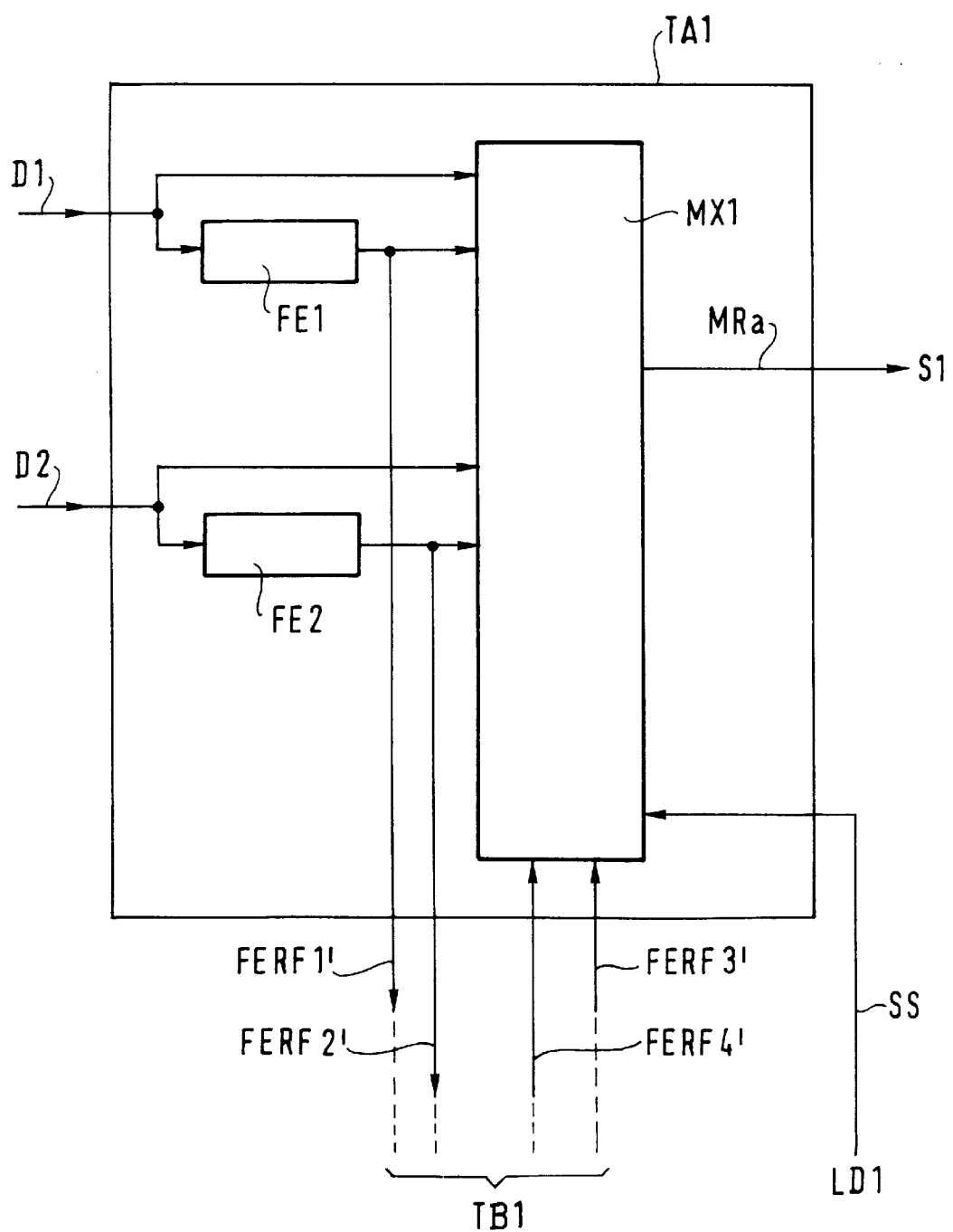

TERMINAL FOR A BIDIRECTIONAL SYNCHRONOUS DIGITAL HIERARCHY LINK WITH AUTOMATIC PROTECTION SWITCHING CONVEYING MULTIPLEXED DATA

BACKGROUND OF THE INVENTION

1. Field of the Invention

The invention concerns a terminal for a bidirectional synchronous digital hierarchy (SDH) link with automatic protection switching conveying multiplexed data. A terminal of this kind is connected to another like terminal by two transmission lines for sending to the other terminal and for receiving from the other terminal, respectively. It can be used for underwater or transmission on a fiber optic cable. The synchronous digital hierarchy (SDH) is generally used for transmitting information over a fiber optic land line. Submarine transmission requires the multiplexing of a plurality of SDH multiplexes and service signals specific to submarine transmission. Each end of a submarine link generally has two SDH receive terminals, two SDH send terminals and a submarine link terminal equipment.

2. Description of the Prior Art

Each SDH receive terminal receives a plurality of SDH multiplexes from land lines and multiplexes them into the form of two identical higher order SDH multiplexes that it supplies to the submarine link terminal equipment. Each SDH send terminal receives two identical SDH multiplexes supplied by the submarine link terminal equipment. It partially demultiplexes them and supplies a plurality of lower order SDH multiplexes to land lines.

If the SDH send terminal is no longer receiving one of the two multiplexes that the submarine link terminal equipment should supply to it, it supplies a link far end failure signal specific to the multiplex concerned to enable diagnosis of a fault affecting the resources at the other end of the link. This signal is a far end remote failure (FERF) signal, for example. The SDH standard provide bits in each frame of 16th order SDH multiplexes for conveying this signal. This signal assumes the value 110 in the event of a fault.

Each submarine link terminal equipment includes:

two send devices, a switch for selecting one of the two multiplexes provided by the respective send devices and sending it in optical form over a submarine link, and a copier device receiving a multiplex supplied by a submarine transmission line in optical form and reconstituting it in the form of two identical multiplexes supplied to the respective SDH send terminals (the copier device preferably reconstitutes two optical signals, but could equally well reconstitute two electrical signals).

A device that is known for controlling the automatic protection switch of the submarine link terminal equipment includes SDH send terminals modified compared to the SDH terminals available off the shelf. Each submarine link terminal equipment being connected to a plurality of SDH send terminals, each of which produces an FERF signal, it is necessary to provide a logic device for deciding to trip the automatic protection switch on the basis of all the FERF signals supplied by these SDH terminals, and to provide a suitable interface for controlling the automatic protection switch in the submarine link terminal equipment. The SDH send terminals available off the shelf do not include these devices and therefore cannot be used without modification.

The submarine link terminal equipment and the SDH terminals being physically separate entities, it is also necessary to interconnect them to transmit the automatic protection switch control signal. This requires the SDH send terminals to be located at a short distance from the submarine link terminal equipment or the provision of regenerators on the link transmitting the automatic protection switch control signals. This device known in itself therefore has the following disadvantages:

The necessity to modify conventional SDH send terminals, available off the shelf but with no automatic protection switch control feature.

The reaction time in the event of failure, i.e. the time to trip the automatic protection switch, depends on the specifications of the SDH send terminals and not only on the standardized characteristics of the link.

The need for an additional link including regenerators if the submarine link terminal equipment is to be located at a relatively great distance from the SDH terminals.

The aim of the invention is to propose a terminal for a bidirectional link with automatic protection switching, in particular a submarine link, that does not have these disadvantages.

SUMMARY OF THE INVENTION

The invention consists in a terminal for a bidirectional synchronous digital hierarchy link with automatic protection switching conveying multiplexed data, said terminal being connected to a second like terminal by first and second transmission lines for respectively sending to said second terminal and receiving from said second terminal, said terminal including:

two send devices each receiving $n$ first and $n$ second SDH multiplexes, where $n$ is greater than or equal to 1, each of said SDH multiplexes respectively conveying $n$ first and $n$ second far end remote failure signals, each send device including:

means for extracting from each of said $n$ first and $n$ second SDH multiplexes the $n$ first and $n$ second far end remote failure signals, respectively, means for supplying a multiplex to be sent over said first line by multiplexing the $n$ first and $n$ second multiplexes received by said send device and service data specific to said link with automatic protection switching, inserting into said data $n$ third and $n$ fourth far end remote failure signals, the latter $2n$ signals being extracted by the other send device, an automatic protection switch for transmitting to said first line one of the two multiplexes respectively supplied by said two send devices, two receive devices each having:

an input connected to said second line to receive the same multiplex transmitted by said second line, said received multiplex conveying $n$ third and $n$ fourth SDH multiplexes respectively including $n$ fifth and $n$ sixth far end remote failure signals and service data specific to said link with automatic protection switching, said data including $n$ seventh and $n$ eighth far end remote failure signals;

means for extracting from the received multiplex said $n$ third and $n$ fourth SDH multiplexes and for extracting said $n$ fifth, $n$ sixth, $n$ seventh and $n$ eighth far end remote failure signals; and a logic device for receiving the 4n far end remote failure signals supplied by each of said two receive devices and deducing therefrom an automatic protection switch control signal.

The above terminal has the advantage of being immediately usable with SDH send devices and SDH receive devices available off the shelf, since the automatic protection switch is controlled by means that are internal to the terminal and totally independent of the SDH devices. The SDH frames are not modified in any way. Furthermore, the reaction time for tripping the automatic protection switch is entirely independent of the specifications of the SDH receive devices.

In one preferred embodiment the means for multiplexing the $n$ first and the $n$ second multiplexes and the service data to yield a multiplex to be sent over the first line and inserting therein $n$ third and $n$ fourth far end remote failure signals further insert the $n$ first and the $n$ second far end remote failure signals into said service data specific to said link with automatic protection switching.

The above terminal has the advantage of transmitting the 4n far end remote failure signals in the same form, i.e. in the service data specific to the link with automatic protection switching. The counterpart terminal therefore receives these 4n signals in exactly the same form, regardless of the position of the automatic protection switch in the terminal that sent them. In other words, the counterpart terminal does not perceive any change in the mode of transmission of these 4n signals if the automatic protection switch is tripped. The management of these signals by the counterpart terminal is therefore simplified.

The invention will be better understood and other features will emerge from the following description and the accompanying drawings.

BRIEF DESCRIPTION OF THE DRAWINGS

FIG. 2 represents a more detailed block schematic of a send device that a submarine link terminal equipment includes in this embodiment.

DETAILED DESCRIPTION OF THE PREFERRED EMBODIMENT

Figure 1A:
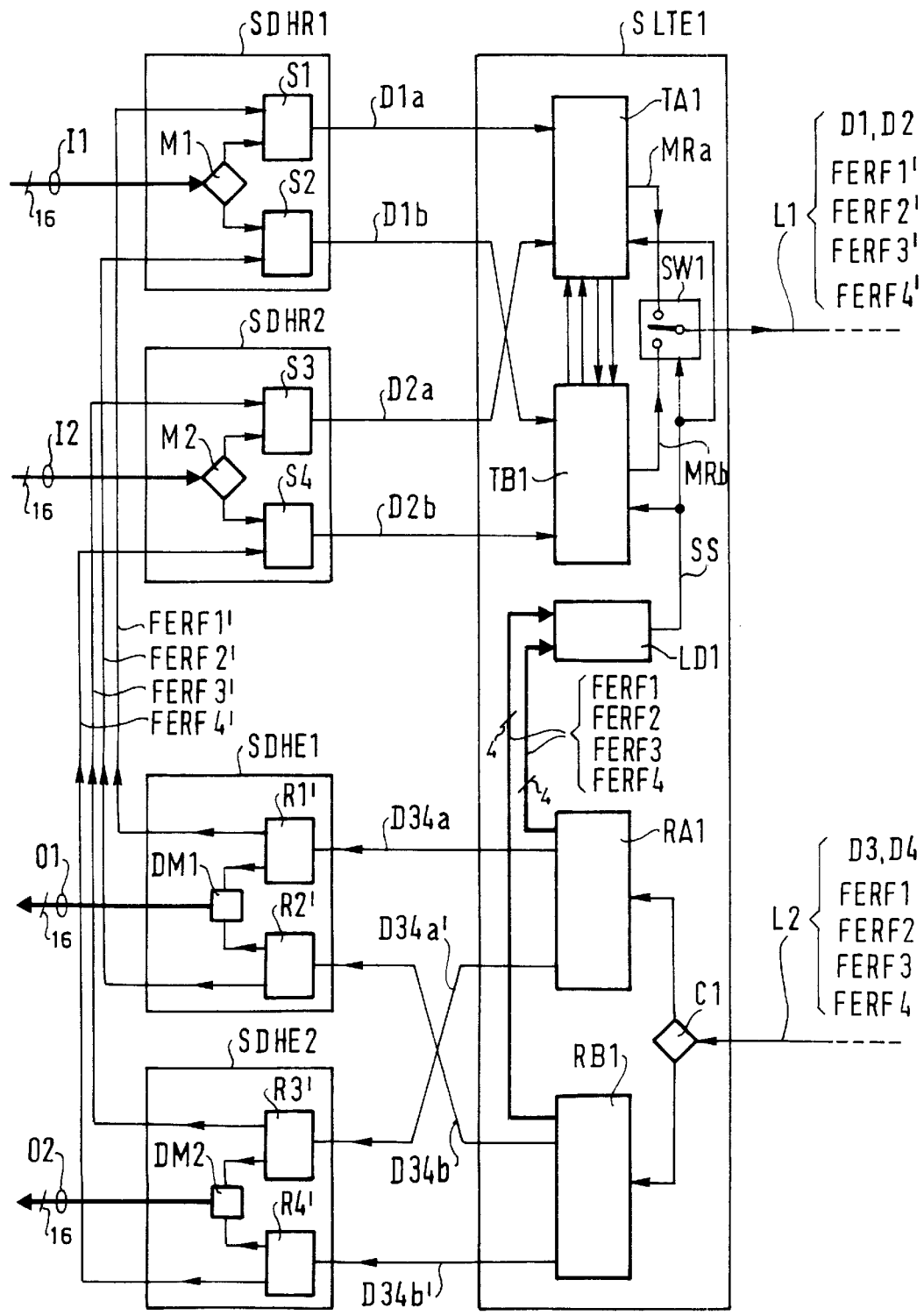
FIGS. 1A, 1B represent the block schematic of one example of a bidirectional submarine link with automatic protection switching in accordance with the invention including two terminals.
Figure 1B:
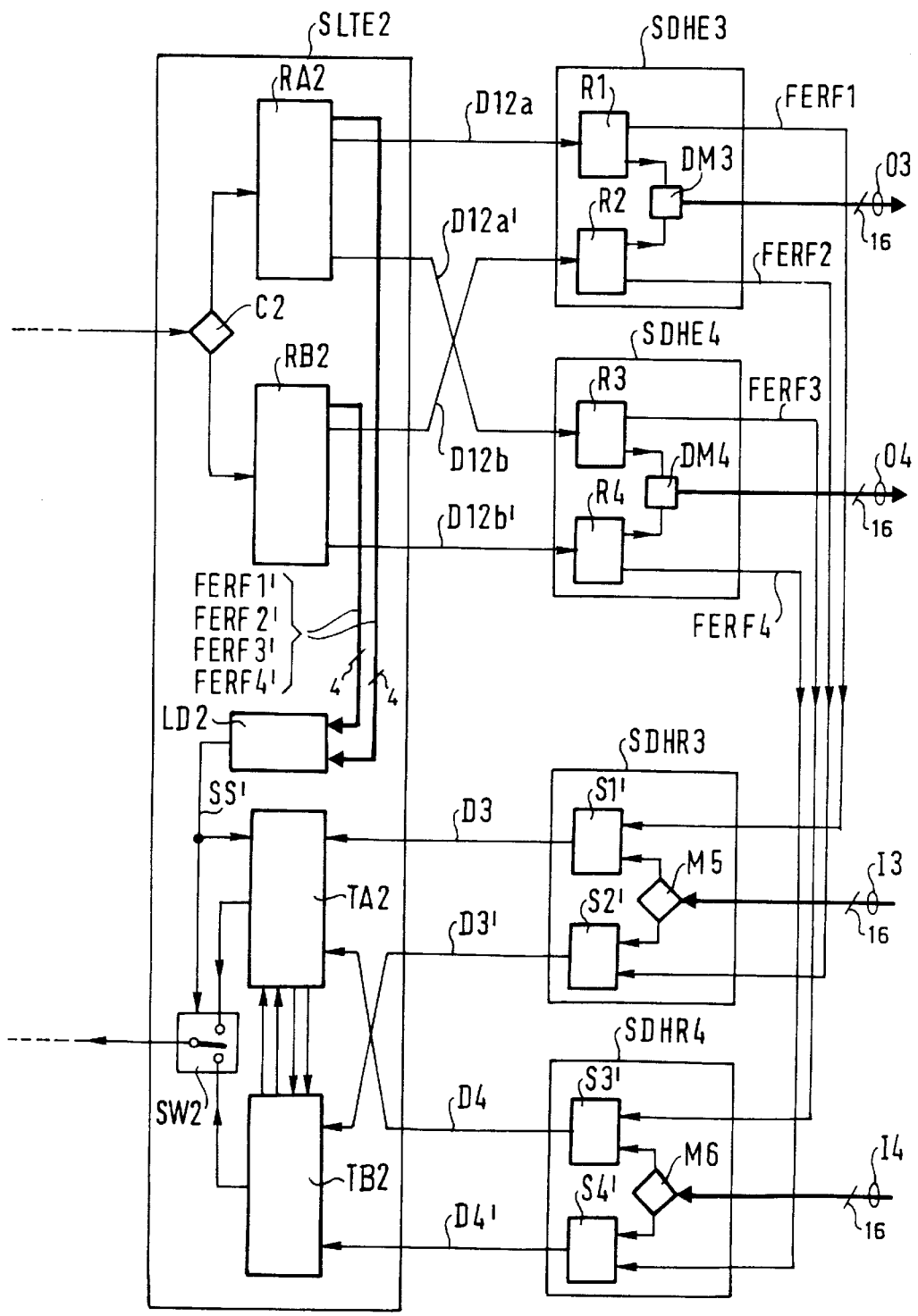

The bidirectional submarine link with automatic protection switching shown by way of example in FIGS. 1A, 1B transmits data at 5 Gbit/s in each direction via an optical transmission submarine line L1 for a first transmission direction and via an optical transmission submarine line L2 for a second transmission direction. Each line L1 and L2 transmits data at a bit rate of 5 Gbit/s increased by an overhead of 0.3 Gbit/s for transmitting service data specific to this submarine link. The preferred embodiment uses eight separate far end remote failure signals (FERF), where the first, second, third and fourth FERFs are referred to as FERF1', FERF2', FERF3', FERF4' and the fifth, sixth, seventh and eighth FERFs are referred to as FERF1, FERF2, FERF3, FERF4.

This embodiment corresponds to n=1. It includes:
  two submarine link terminal equipments SLTE1 and SLTE2 at respective ends of the submarine lines L1 and L2;
  two SDH receive terminals SDHR1 and SDHR2 for respectively receiving 16 SDH multiplexes I1 and 16 SDH multiplexes I2 supplied by land lines;
  two SDH send terminals SDHE1 and SDHE2 for respectively sending 16 SDH multiplexes O1 and 16 SDH multiplexes O2 via land lines;
  two SDH terminals SDHE3 and SDHE4 for respectively sending 16 SDH multiplexes O3 and 16 SDH multiplexes O4 via land lines; and
  two SDH receive terminals SDHR3 and SDHR4 for respectively receiving 16 SDH multiplexes I3 and 16 SDH multiplexes I4 supplied by land lines.

The terminals SDHE1 and SDHR1 are generally combined in the same equipment. Similarly, the terminals SDHE2 and SDHR2 are combined in the same equipment.

All the receive terminals SDHR1, SDHR2, SDHR3, SDHR4 have the same structure, a simplified version of which will be described here. For example, the receive terminal SDHR1 includes:
  a first input receiving the 16 first order SDH multiplexes I1 which each convey a fourth order virtual container,
  a second input receiving a far end remote failure signal FERF1',
  a third input receiving a far end remote failure signal FERF2',
  a device M1 for disencapsulating the 16 fourth order virtual containers, adding an overhead to them and thereby constituting 16 fourth order administrative units, then multiplexing them into a sixteenth order synchronous transport module, this device M1 having an input receiving the 16 first order multiplexes I1 and two outputs each reconstituting a sixteenth order synchronous transport module, these two modules each transporting the content of the 16 SDH multiplexes, but possibly differing slightly in terms of the data constituting the overhead,
  a first multiplexer S1 having an input constituting the second input of the receive terminal SDHR1, a second input connected to an output of the broadcaster M1 and an output constituting a first output of the receive terminal SDHR1 and supplying a sixteenth order SDH multiplex D1$a$, and
  a second multiplexer S2 having a first input connecting the second output of the broadcaster M1, a second input constituting the third input of the receive terminal SDHR1 and an output constituting a second output of the receive terminal SDHR1 and supplying a sixteenth order SDH multiplex D1$b$.

The multiplexer S1 inserts the signal FERF1' and the service data SDH into each sixteenth order frame supplied at the first output and the multiplexer S2 inserts the signal FERF2' and SDH service data into each sixteenth order frame supplied at the second output. The first and second outputs of the receive terminal SDHR2 likewise supply two sixteenth order SDH multiplexes D2$a$ and D2$b$. The first and second outputs of the receive terminal SDHR3 likewise supplied two sixteenth order SDH multiplexes D3 and D3'. The first and second outputs of the receive terminal SDHR4 likewise supply two sixteenth order SDH multiplexes D4 and D4'.

The duplication of the wanted data in the multiplexes D1$a$ and D1$b$, respectively D2$a$ and D2$b$, enables the terminals SLTE1 and SLTE2 to remedy failure of a part of the link.

All the send terminals SDHE1, SDHE2, SDHE3, SDHE4 have the same conventional structure, a simplified version of which will be described here. For example, the terminal SDHE1 includes:
  two inputs respectively receiving a sixteenth order SDH multiplex D34$a$ and a sixteenth order SDH multiplex D34*b* supplied by the submarine link terminal equipment SLTE1 and which are identical if there is no fault, a first output supplying the far end remote failure signal FERF1', this signal being active if the multiplex D34*a* is no longer received correctly, a second output supplying the far end remote failure signal FERF2', this signal being active if the multiplex D34*b* is no longer received correctly, a third, multiple output supplying the 16 SDH multiplexes O1 to land lines, two demultiplexers R1' and R2' which demultiplex the sixteenth order SDH frames supplied by the multiplexes D34*a* and D34*b*, extract from them the data to constitute the payload of 16 first order SDH frames and produce the signals FERF1' and FERF2' in the case of bad reception of the multiplexes D34*a* and D34*b*, respectively, and a set of 16 selectors DM1 which receive the data extracted by the demultiplexers R1' and R2' and place it in first order SDH frames to constitute the 16 SDH multiplexes O1.

The second terminal SDHE2 processes in a similar manner two sixteenth order SDH multiplexes D34*a*' and D34*b*' which are identical if there is no fault. The send terminal SDHE3 processes in a similar manner two sixteenth order SDH multiplexes D12*a* and D12*b* which are identical if there is no fault. The send terminal SDHE4 processes in a similar manner two sixteenth order SDH multiplexes D12*a*' and D12*b*' which are identical if there is no fault.

The two submarine link terminal equipments SLTE1 and SLTE2 have the same structure. For example, the terminal SLTE1 includes:

two identical devices TA1 and TB1 for sending over a submarine line which protect each other, the device TA1 having:
two inputs constituting two inputs of the submarine link terminal equipment SLTE1 which are respectively connected to the first outputs of the receive devices SDHR1 and SDHR2 to receive the multiplexes D1*a* and D2*a*, respectively,
two inputs connected to two outputs of the other send device TB1 to receive two other far end remote failure signals FERF3', FERF4',
two outputs respectively connected to two inputs of the other send device TB1 to supply to it the two far end remote failure signals FERF1', FERF2', and
an output supplying a multiplex MRa,
and the device TB1 having:
two inputs constituting two inputs of the submarine link terminal equipment SLTE1 which are respectively connected to the second outputs of the receive devices SDHR1 and SDHR2 to receive the multiplexes D1*b* and D2*b*, respectively,
two inputs respectively connected to two outputs of the send device TA1 to receive the far end remote failure signals FERF1' and FERF2',
two outputs connected to two inputs of the send device TA1 to supply the far end remote failure signals FERF3' and FERF4', and
an output supplying a multiplex MRb, a switch SW1 having an input connected to the output of the send device TA1 supplying the multiplex MRa, an input connected to the output of the send device TB1 supplying the multiplex MRb, a control input and an output supplying an optical signal to the line L1, a logic device LD1 having eight inputs and one output, the latter supplying a control signal SS and being connected to the control input of the automatic protection switch SW1, to an input of the device TA1, and to an input of the device TB1, a copier device C1 having an input connected to the line L2 and two outputs supplying in optical form two copies of the multiplex transmitted by the line L2, and two identical submarine line receive devices RA1 and RB1 which protect each other, each having an input connected to an output of the copier device C1, four first outputs supplying to four inputs of the logic device LD1 four far end remote failure signals FERF1, FERF2, FERF3, FERF4, and two second outputs supplying two identical copies of a sixteenth order SDH multiplex.

The second outputs of the receive device RA1 respectively supply the two SDH multiplexes D34*a* and D34*a*' conveying the data from the multiplexes I3 and I4. The second outputs of the receive device RB1 respectively supply the SDH multiplexes D34*b* and D34*b*' which also convey the data from the multiplexes I3 and I4.

In a similar manner, the second outputs of the receive device RA2 respectively supply the two SDH multiplexes D12*a* and D12*a*' conveying the data from the multiplexes I1 and I2. The second outputs of the receive device RB2 respectively supply the SDH multiplexes D12*b* and D12*b*' which also convey the data from the multiplexes I1 and I2.

For example, the automatic protection switch SW1 includes a passive optical coupler having two ports connected to respective optical outputs of the send devices TA1 and TB1 and a port connected to the line L1. The terminals TA1 and TB1 each include an optical sender. The automatic protection switch SW1 is controlled by turning one of the optical senders on and the other off. The two optical senders are modulated by the multiplexes MRa and MRb, respectively.

The copier device C1 comprises an optical splitter supplying two optical signals to respective inputs of the receive devices RA1 and RB1.

FIG. 2 shows by way of example the block schematic of the send device TA1. The send devices TB1, TA2, TB2 have identical structures. The device TA1 includes:

a device FE1 for extracting a far end remote failure signal having an input connected to the first input of the device TA1 to extract the signal FERF1' from the multiplex D1*a* and to supply it to an input of the send device TB1, a device FE2 for extracting a far end remote failure signal having an input connected to the second input of the send device TA1 to extract a signal FERF2' and to supply it to an input of the send device TB1, a multiplexer MX1 having two inputs respectively connected to the first and second inputs of the send device TA1 to receive the multiplexes D1*a* and D2*a*, two inputs respectively connected to the outputs of the extractor devices FE1 and FE2, two inputs respectively connected to other inputs of the send device TB1 to receive two other far end remote failure signals FERF3' and FERF4', an input connected to the output of the logic device LD1 supplying the signal SS controlling the automatic protection switch SW1, and an output supplying a multiplex obtained by multiplexing the multiplexes D1*a* and D2*a* and service data specific to the submarine link with automatic protection switching.

In a preferred embodiment this data includes the four signals FERF1', FERF2', FERF3', FERF4'.

The two multiplexes D1a and D2a retain the standardized SDH frame structure. Two of the far end remote failure signals FERF1' and FERF2' are therefore transmitted redundantly, since they are present in these frames. This redundancy is no disadvantage. To the contrary, it is advantageous to transmit the four far end remote failure signals FERF1, FERF2, FERF4 in the same manner. The receive devices RA2 and RB2 receive these four signals in the same fashion regardless of the state of the automatic protection switch SW1. There is therefore no need to allow for tripping of the automatic protection switch SW1.

Note also that the multiplexer MX1 transmits the value of the signal SS to indicate the state of the switch SW1 to the remote terminal.

In a different embodiment the far end remote failure signals FERF1', FERF2' are transmitted only in the frames of the multiplexes MRa, MRb and the far end remote failure signals FERF3', FERF4' are transmitted in the service data, for a first state of the switch SW1. The receive devices RA2 and RB2 include means for identifying the far end remote failure signals received, according to the state of the automatic protection switch SW1. This state is transmitted as part of the service data.

Figure 3:
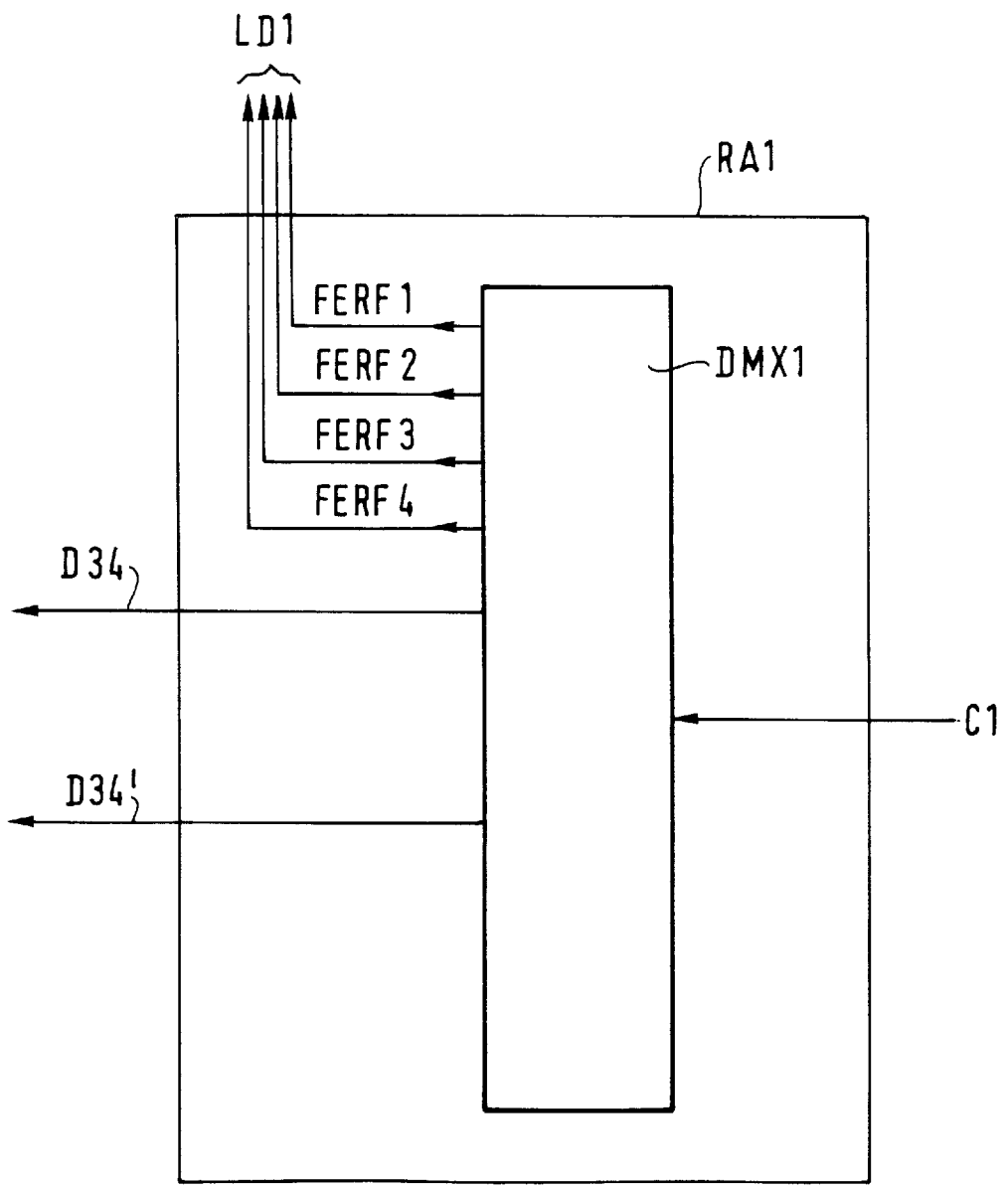
FIG. 3 represents a more detailed block schematic of a receive device that a submarine link terminal equipment includes in this embodiment.

FIG. 3 shows by way of example the block schematic of the receive device RA1. The other receive devices RB1, RA2, RB2 have identical structures. The device RA1 includes a demultiplexer DMX1 having an input constituting the input of the device RA1, four outputs supplying to the logic circuit LD1 four far end remote failure signals FERF1, FERF2, FERF3 and FERF4, respectively, and two outputs supplying respective identical copies D34 and D34' of an SDH multiplex obtained from the multiplex received at the input of the demultiplexer DMX1 by eliminating the service data specific to the submarine link.

With reference to FIGS. 1a, 1b, consider operation in the case where all units are operating perfectly, the automatic protection switch SW1 is commanded to transmit the multiplex MRa supplied by the send device TA1 and the automatic protection switch SW2 is commanded to transmit a multiplex supplied by the send device TA2.

The 16 first order SDH multiplexes I1 are duplicated by the broadcaster M1 and then multiplexed into a sixteenth order multiplex D1a by the multiplexer S1 and into a sixteenth order multiplex D2a by the multiplexer S2. The multiplexers S1 and S2 respectively insert the far end remote failure signals FERF1' and FERF2' into the appropriate bits of the two multiplexes D1a and D1b. These multiplexes D1a and D1b are applied to respective inputs of the send devices TA1 and TB1 of the submarine link terminal equipment SLTE1. The two send devices TA1 and TB1 operate simultaneously, but in this example the automatic protection switch SW1 selects only the multiplex MRa supplied by the output of the device TA1 to transmit it over the line L1.

In a similar manner, the broadcaster M2 of the receive terminal SDHR2 duplicates the 16 SDH multiplexes I2. The multiplexers S3 and S4 respectively convert them into a sixteenth order multiplex D2a and another sixteenth order multiplex D2b. The multiplexers S3 and S4 respectively insert the far end remote failure signals FERF3' and FERF4' into the appropriate bits of these two multiplexes. The SDH multiplexes D2a and D2b are applied to respective inputs of the send devices TA1 and TB1.

As shown in FIG. 2, the send device TA1 extracts the signals FERF1' and FERF2' from the multiplexes D1a and D2a to communicate them to the send device TB1. Symmetrically, the device TB1 extracts the signals FERF3' and FERF4' from the multiplexes D1b and D2b to communicate them to the send device TA1. In the send device TA1, the multiplexer MX1 multiplexes the two multiplexes D1a and D2a and service data specific to the submarine link with automatic protection switching by inserting the far end remote failure signals FERF1', FERF2', FERF3', FERF4' into this data. The multiplex transmitted over the submarine link L1 therefore includes not only the data of the multiplexes I1 and I2 but also the four failure signals sent by the demultiplexers R1', R2', R3', R4'. The same goes for the multiplex supplied by the send device TB1. Accordingly, in the event of failure of the device TA1 or of the device TA2, the four far end remote failure signals FERF1', FERF2', FERF3', FERF4' are all transmitted anyway.

The multiplex conveyed by the submarine line L1 is copied by the broadcaster C2 of the terminal SLTE2 to yield two identical multiplexes to be applied identically to the two receive devices RA2 and RB2 of the terminal SLTE2. These two receive devices operate in a similar manner to the receive device RA1 shown in FIG. 3. Each supplies on respective outputs two identical multiplexes D12 and D12' including all of the data of the multiplexes I1 and I2 and supplies on four other outputs the far end remote failure signals FERF1', FERF2', FERF3', FERF4' which represent failures detected on reception in the devices SDHE1 and SDHE2 at the other end of the link.

These four failure signals are applied to the logic circuit LD2 of the terminal SLTE2 to control the automatic protection switch SW2 which selects either the output of the send device TA2 or the output of the send device TB2 of the terminal SLTE2. This logic device LD2 calculates the following logic function:

(FERF1' AND FERF2') OR (FERF3' AND FERF4') and commands the automatic protection switch SW2 to transmit the multiplex supplied by the device TB2 if this logic function takes the value 1 for longer than a fixed duration, for example 100 ms. Switching can additionally depend on additional logical signals indicating faults in the terminal SLTE2.

After a decision to trip the automatic protection switch SW2, its status is fixed for a programmable duration, for example one second, in order to ignore transient phenomena that may occur just after switching.

Transmission in the other direction is protected in a similar manner. The multiplexers R1 and R2 of the terminal SDHE3 supply the far end remote failure signals FERF1 and FERF2, respectively. The multiplexers R3 and R4 of the terminal SDHE4 supply the far end remote failure signals FERF3 and FERF4, respectively. The far end remote failure signals FERF1, FERF2, FERF3, FERF4 are conveyed by the submarine line L2 in a similar manner to that described for the signals FERF1', FERF2', FERF3', FERF4'. They are extracted by the receive devices RA1 and RB1 and are applied to the logic circuit LD1 to control the automatic protection switch SW1 so that it is ripped if the logic function:

(FERF1 AND FERF2) OR (FERF3 AND FERF4) takes the value 1.

The scope of the invention is not limited to architectures with 1+1 type redundancy; it is equally applicable to architectures with 1+n type redundancy where n is greater than 1.

There is claimed:

1. A terminal for a bidirectional synchronous digital hierarchy link with automatic protection switching conveying multiplexed data, said terminal being connected to a second like terminal by first and second transmission lines for respectively sending to said second terminal and receiving from said second terminal, said terminal including:

two send devices each receiving $n$ first and $n$ second SDH multiplexes, where $n$ is greater than or equal to 1, each of said SDH multiplexes respectively conveying $n$ first and $n$ second far end remote failure signals, each send device including:

means for extracting from each of said $n$ first and $n$ second SDH multiplexes the $n$ first and $n$ second far end remote failure signals, respectively, means for supplying a multiplex to be sent over said first line by multiplexing the $n$ first and $n$ second multiplexes received by said send device and service data specific to said link with automatic protection switching, and inserting into said data $n$ third and $n$ fourth far end remote failure signals, the latter $2n$ signals being extracted by the other send device, an automatic protection switch for transmitting to said first line one of the two multiplexes respectively supplied by said two send devices, two receive devices each having:

an input connected to said second line to receive the same multiplex transmitted by said second line, said received multiplex conveying $n$ third and $n$ fourth SDH multiplexes respectively including $n$ fifth and $n$ sixth far end remote failure signals and service data specific to said link with automatic protection switching, said data including $n$ seventh and $n$ eighth far end remote failure signals;

means for extracting from the received multiplex said $n$ third and $n$ fourth SDH multiplexes and for extracting said $n$ fifth, $n$ sixth, $n$ seventh and $n$ eighth far end remote failure signals, and a logic device for receiving the $4n$ far end remote failure signals supplied by each of said two receive devices and deducing therefrom an automatic protection switch control signal.

2. The terminal claimed in claim 1 wherein said means for multiplexing said $n$ first and said $n$ second multiplexes and said service data to yield a multiplex to be sent over said first line and inserting therein $n$ third and $n$ fourth far end remote failure signals further insert said $n$ first and said $n$ second far end remote failure signals into said service data specific to said link with automatic protection switching.

3. The terminal claimed in claim 1 wherein said means for extracting from said received multiplex said $n$ third and said $n$ fourth SDH multiplexes and for extracting said $n$ fifth, $n$ sixth, $n$ seventh and $n$ eighth far end remote failure signals extract said $n$ fifth, $n$ sixth, $n$ seventh and $n$ eighth far end remote failure signals from said service data specific to said link with automatic protection switching.

* * * * *